US007778668B2

(12) United States Patent
Miyauchi

(10) Patent No.: US 7,778,668 B2
(45) Date of Patent: Aug. 17, 2010

(54) PORTABLE CELLULAR PHONE SYSTEM AND PORTABLE CELLULAR PHONE TERMINAL DEVICE USED IN SAME SYSTEM

(75) Inventor: Nobuaki Miyauchi, Tokyo (JP)

(73) Assignee: NEC Corporation, Tokyo (JP)

( * ) Notice: Subject to any disclaimer, the term of this patent is extended or adjusted under 35 U.S.C. 154(b) by 1377 days.

(21) Appl. No.: 11/222,599

(22) Filed: Sep. 9, 2005

(65) Prior Publication Data

US 2006/0052135 A1 Mar. 9, 2006

(30) Foreign Application Priority Data

Sep. 9, 2004 (JP) ............................. 2004-261912

(51) Int. Cl.
*H04M 1/00* (2006.01)
*H04B 1/38* (2006.01)
(52) U.S. Cl. ...................... 455/558; 455/410; 455/411; 455/418; 455/420; 455/435.1; 455/550.1; 455/564; 455/565; 713/182; 713/185
(58) Field of Classification Search ......... 455/410–411, 455/418–420, 435.1, 550.1, 556.1–556.2, 455/557–558, 564–565, 90.1; 713/182–185
See application file for complete search history.

(56) References Cited

U.S. PATENT DOCUMENTS 6,124,799 A * 9/2000 Parker ........................ 340/5.85

| 6,889,043 | B2 * | 5/2005 | Okazaki et al. ........... 455/435.1 |
| 6,947,727 | B1 * | 9/2005 | Brynielsson ................. 455/411 |
| 7,054,613 | B2 * | 5/2006 | Smeets ........................ 455/410 |
| 7,137,003 | B2 * | 11/2006 | Krishnan et al. ............. 713/172 |

FOREIGN PATENT DOCUMENTS

| CN | 1310545 A | 8/2001 |
| CN | 1469675 A | 1/2004 |
| JP | 2000-174894 | 6/2000 |
| JP | 2001-197197 | 7/2001 |
| JP | 2001-313695 | 11/2001 |
| JP | 2002-163555 | 6/2002 |
| JP | 2003-199170 | 7/2003 |
| JP | 2004-235924 | 8/2004 |
| JP | 2004-328650 | 11/2004 |

* cited by examiner

*Primary Examiner*—Tuan A Tran
(74) *Attorney, Agent, or Firm*—Scully, Scott, Murphy & Presser, P.C.

(57) ABSTRACT

A portable cellular phone terminal device having a communication function for communicating via a network and at least one accessory function in addition to the communication function, the portable cellular phone terminal device including: a reading section for reading ID information containing information for connection with the network from a storage media that stores the ID information and is configured to be detachable; and a control section for restricting on utilizing the accessory function in a case where the storage media is detached or the communication by use of the ID information is not allowed.

9 Claims, 7 Drawing Sheets

FIG.6

| User ID | Contract Terms | Contract Class |
|---|---|---|
| 001 | ○ | A |
| 002 | ○ | B |
| 003 | × | — |
| ⋮ | ⋮ | ⋮ |

| Model | Function | | | |
| | Camera-photographing | Camera-photographed Image Saving | TV | ·· |
|---|---|---|---|---|
| ab1 | Unrestricted | A,B | — | ·· |
| ab2 | A,B | A,B | — | ·· |
| ab3 | A | A | A | ·· |
| ⋮ | ⋮ | ⋮ | ⋮ | ⋮ |

US 7,778,668 B2

PORTABLE CELLULAR PHONE SYSTEM AND PORTABLE CELLULAR PHONE TERMINAL DEVICE USED IN SAME SYSTEM

BACKGROUND OF THE INVENTION

1. Field of the Invention

The present invention relates to a portable cellular phone terminal, device and a portable cellular phone system that incorporates the same.

The present application claims priority of Japanese Patent Application No. 2004-261912 filed on Sep. 9, 2004, which is hereby incorporated by reference.

2. Description of the Related Art

Recently, a portable cellular phone terminal device has been provided with expensive accessory functions such as a camera or a TV tuner. For example, a camera performance of a camera-attached portable cellular phone terminal device has improved remarkably, so as to almost equal to that of an ordinary digital camera. Further, ease-of-use of the other functions has also improved, so that the accessory functions of the portable cellular phone terminal device other than communication functions are highly evaluated in utilization (Japanese Patent application Laid-open No. 2002-163555).

Conventionally, cellular phone service providers have employed an approach to increase contracted subscribers by providing a portable cellular phone terminal device less expensive than its net production cost. After selling the inexpensive portable cellular phone terminal device to the subscribers, the cellular phone service providers expect to collect a difference by charging for utilization of the portable cellular phone terminal device or a like. However, if the user buys the portable cellular phone terminal device from the cellular phone service provider and immediately cancels a contract of cellular phone services in order to utilize accessory functions of the portable cellular phone terminal device, the cellular phone service provider cannot collect a difference due to the inexpensive selling of the portable cellular phone terminal device. Conventionally, even if the subscriber who bought the portable cellular phone terminal device inexpensively has cancelled the contract of the cellular phone services, he can still have the portable cellular phone terminal device and use its accessory functions.

As described above, as the accessory functions of the portable cellular phone terminal device are improved, it has been concerned that more and more users would buy the portable cellular phone terminal device from the cellular phone service provider and immediately cancel the contract in order to utilize the accessory functions. Therefore, there is a need for such a system as to suppress such users from increasing.

It is to be noted that recently the portable cellular phone terminal device has been used more widely which uses an IC card such as an SIM card or a USIM card that stores information including a phone number of the user and information of the cellular phone service provider with which he is under contract. With such the portable cellular phone terminal device, by replacing the SIM card or a like, it is possible to use the same phone number among a plurality of portable cellular phone terminal devices. It is also possible to use the same portable cellular phone terminal device among a plurality of phone numbers.

It is necessary to allow for such the portable cellular phone terminal device using an SIM card when designing the system that suppresses an increase in number of the users who would like to temporarily contract for cellular phone services and buy the portable cellular phone terminal device inexpensively in order to utilize its accessory functions as described above.

SUMMARY OF THE INVENTION

In view of the above the present invention has been developed, and it is an object of the present invention to provide a technology to control utilization of accessory functions of a portable cellular phone terminal device other than communication functions according to results of a use of the portable cellular phone services by the device itself.

According to a first aspect of the present invention, there is provided a portable cellular phone terminal device having a communication function for communicating via a network and at least one accessory function in addition to the communication function, the portable cellular phone terminal device including:

a reading section for reading ID information containing information for connection with the network from a storage media that stores the ID information and is configured to be detachable; and a control section for restricting on utilizing the accessory function in a case where the storage media is detached or the communication by use of the ID information is not allowed.

In the foregoing first aspect, the accessory functions refers to a camera, a TV, music play-back, a schedule book, a memo (voice recorder), a calculator, a clock, an alarm, a stop watch, a dictionary, a game, or a like, for example. The control section can restrict utilization of those functions by controlling reading of a program that is activated when performing the functions.

Further, the storage media is a card having a built-in IC chip such as a subscriber identity module (SIM) card used in, for example, a GSM-scheme portable cellular phone terminal device or a universal subscriber identity module (USIM) card, which is a W-CDMA version of the SIM card. The ID information contains a phone number, a user ID, information of a cellular phone service provider with which a user of the portable cellular phone terminal device is under contract, information of a contract with the cellular phone service provider, and a like.

By such a configuration, for example, even if the storage media is not attached or even if communication is disabled because the contract with the cellular phone service provider is cancelled although the storage media is attached, it is possible to restrict utilization of accessory functions not related to communication. Accordingly, the utilization of the accessory functions is restricted if the contract with the cellular phone service provider is cancelled, so that it is possible to suppress an increase in number of users who would buy a portable cellular phone terminal device from the cellular phone service provider and immediately cancel the contract with the cellular phone service provider only in order to utilize accessory functions of the portable cellular phone terminal device.

With the first aspect, it is possible to establish function-specific utilization restrictions, for example, to restrict utilization of only such value-added functions as those of, for example, a camera, a TV, and music play-back so that the other functions can be utilized. It is thus possible to provide convenience to users to some extent while suppressing an increase in number of the users who would buy the portable cellular phone terminal device from the cellular phone service provider and immediately cancel the contract with the cellular phone service provider only in order to utilize accessory functions of the portable cellular phone terminal device.

According to a second aspect of the present invention, there is provided a portable cellular phone terminal device having a communication function for communicating via a network and at least one accessory function in addition to the communication function, the portable cellular phone terminal device including:

a reading section for reading user information of a user who has contracted for cellular phone services provided by a cellular phone service provider, from a storage media that stores the user information and is configured to be detachable; and a control section for restricting on utilizing the accessory function based on results of a use of the portable cellular phone services by the device itself, the results included in the user information.

In the foregoing second aspect, the user information contains a phone number of the user, a user ID, information of the cellular phone service provider with which the user is under contract, information of the contract with the cellular phone service provider, and the like.

Accordingly, it is possible to restrict utilization of the accessory function in a case, for example, where the user has cancelled the contract with the cellular phone service provider. In such a manner, the utilization of the accessory function is restricted if the contract with the cellular phone service provider is cancelled, so that it is possible to suppress an increase in number of users who would buy the portable cellular phone terminal device from the cellular phone service provider and immediately cancel the contract with it only in order to utilize the accessory function.

The control section can permit unrestricted utilization of the accessory function based on, for example, the user information as long as the user is under contract with the cellular phone service provider. Further, even in a case where the user has cancelled the contract with the cellular phone service provider, it can permit utilization of the accessory function for a predetermined period after the cancellation of the contract.

Also, the portable cellular phone terminal device may further include a storage device for storing a password, so that a password acceptance section can decide whether a password it has accepted is valid or not according to whether this password agrees with a password stored in the storage device. Further, by registering passwords beforehand to a center managed by the cellular phone service provider, the password acceptance section transmits to the center an accepted password together with ID information and user information stored in the storage media so that it can receive from the center a result of decision on whether the password is valid or not. In this case, the password acceptance section can transmit terminal information of the portable cellular phone terminal device also to the center simultaneously. The center can have the ID information, the user information, the terminal information of the portable cellular phone terminal device, and a table associated with passwords and so can decide whether a password is valid or not by referencing the table.

In such a manner, in a case where the portable cellular phone terminal device provided with the accessory function is, for example, stolen by an illegal user, even if another user tries to utilize the accessory function by attaching his own storage media to the portable cellular phone terminal device, it is possible to restrict utilization of the accessory function. It is thus possible to mitigate damages due to robbery etc. of the portable cellular phone terminal device having the accessory function.

It is to be noted that any combinations of the above-described components as well as substitutions of expression of the present invention between methods and apparatuses are valid as aspects of the present invention.

As described above, with the above configurations, it is possible, at the portable cellular phone terminal device having the accessory functions other than communication functions, to restrict utilization of the accessory functions according to results of a use of the portable cellular phone services by the device itself.

According to a second aspect of the present invention, there is provided a portable cellular phone system including:

a portable cellular phone terminal device having a communication function for communicating via a network and at least one accessory function in addition to the communication function, the portable cellular phone terminal device including:

a reading section for reading user information of a user who has contracted for cellular phone services provided by a cellular phone service provider, from a storage media that stores the user information and is configured to be detachable; and a control section for restricting on utilizing the accessory function based on results of a use of the portable cellular phone services by the device itself, the results included in the user information, and an information transmitting center further including:

an information acquisition section for acquiring the user information stored in the storage media attached to the portable cellular phone terminal device, from the portable cellular phone terminal device; and a transmission section for transmitting to the portable cellular phone terminal device the utilization restricting information about the accessory function defined in accordance with the results of the use of the portable cellular phone services by the device itself, the results included in the user information.

BRIEF DESCRIPTION OF THE DRAWINGS

The above and other objects, advantages, and features of the present invention will be more apparent from the following description taken in conjunction with the accompanying drawings, in which:

FIG. 6 is a table for showing one example of an internal configuration of a user information storage section of the center side apparatus shown in FIG. 5;

FIG. 7 is a table for showing one example of an internal configuration of a terminal function storage section of the center side apparatus shown in FIG. 5.

DETAILED DESCRIPTION OF THE PREFERRED EMBODIMENTS

Best mode of carrying out the present invention will be described in further detail using various embodiments with reference to the accompanying drawings.

First Embodiment

In the first embodiment of the present invention, a cellular phone service provider provides a user who has subscribed a contract of cellular phone services from the cellular phone service provider with a storage media in which user information of the user is stored. The user information as used herein refers to, for example, a phone number of the user, information of the contracting cellular phone service provider, or a like. By attaching the storage media to the user's portable cellular phone terminal device, the user can use the portable cellular phone terminal device for communication. The storage media is configured to be detachable from the portable cellular phone terminal device.

A portable cellular phone terminal device in the present embodiment is configured as follows: User information is read from a thus attached storage media and, based on the user information, it is detected whether a relevant user is under contract with the cellular phone service provider so that utilization of functions of the portable cellular phone terminal device may be restricted according to a result of this detection. The portable cellular phone terminal device of the present embodiment is configured further so that utilization of the functions of the portable cellular phone terminal device may be restricted even if the storage media is detached.

If the user of the portable cellular phone terminal device has cancelled the contract of cellular phone services, the cellular phone service provider can get the storage media returned from the user and also perform processing to rewrite the user information of the user's storage media at a center that they manage. It is thus possible to restrict utilization of the functions according to whether the user is under contract with the cellular phone service provider.

Figure 1:
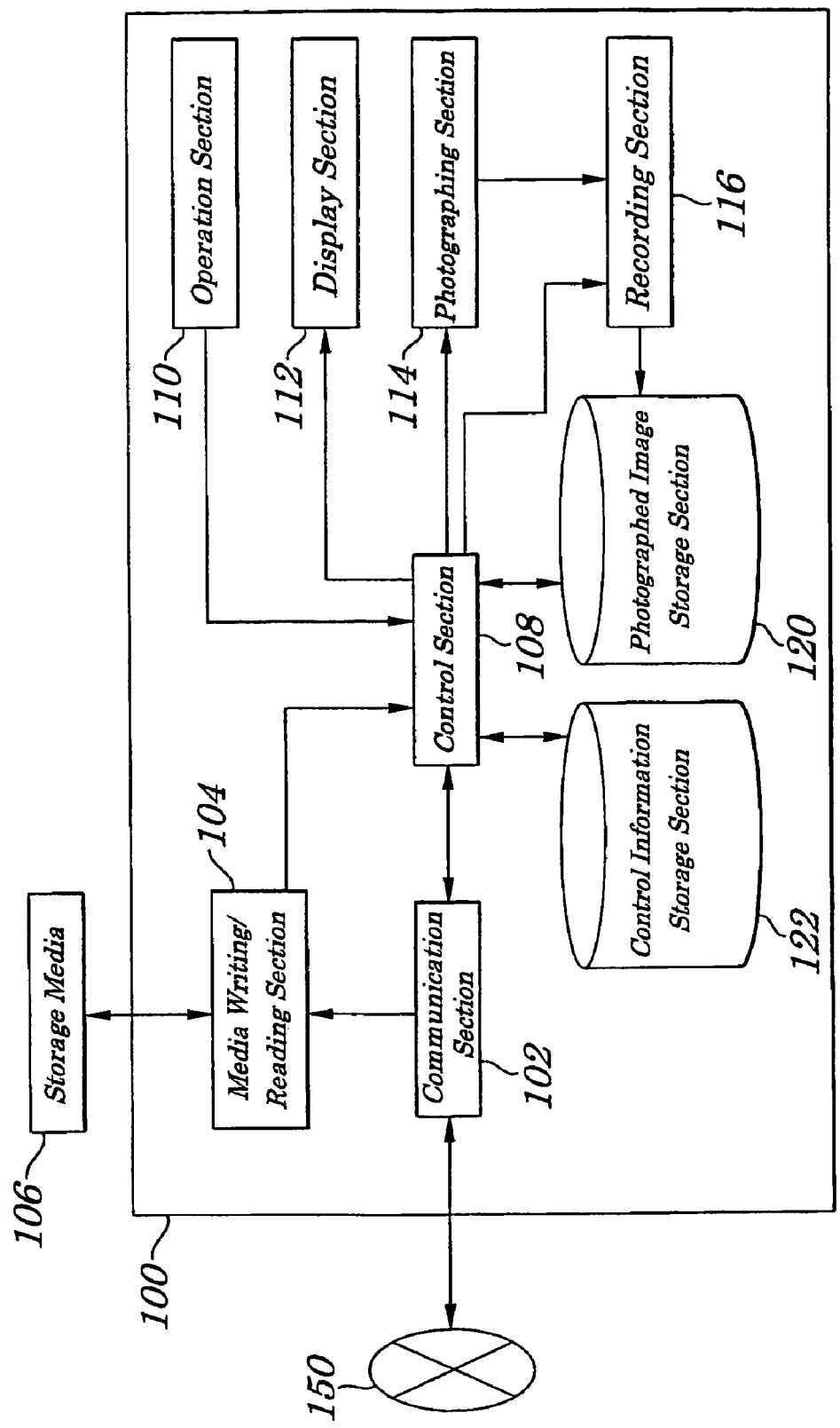
FIG. 1 is a block diagram for showing a configuration of a portable cellular phone terminal device according to a first embodiment of the present invention.

FIG. 1 is a block diagram for showing a configuration of a portable cellular phone terminal 100 device according to the first embodiment.

The portable cellular phone terminal device 100 includes a communication section 102, a media writing/reading section 104, a control section 108, an operation section 110, a display section 112, a photographing section 114, a recording section 116, a photographed image storage section 120, and a control information storage section 122. Further, the portable cellular phone terminal device 100 is equipped with an attachable/detachable storage media 106 (hereinafter, simply referred to as a storage media).

The storage media 106 is a card having a built-in IC chip such as a subscriber identity module (SIM) card used in, for example, a GSM-scheme portable cellular phone terminal device or a universal subscriber identity module (USIM) card, which is a W-CDMA version of the SIM card. The storage media 106 stores user information such as a phone number of a user, a user ID, information of a cellular phone service provider with which the user contracts, information of a contract with the cellular phone service provider, or a like. When the storage media 106 is attached to the portable cellular phone terminal device 100, the portable cellular phone terminal device 100 of the present embodiment can communicate through a network 150.

The communication section 102, when connected to the network 150, communicates through the network 150 with other portable cellular phone terminal devices, electronic mail terminals, or a like.

The media writing/reading section 104 reads user information stored in the storage media 106 or rewrites the user information stored in the storage media 106 according to information transmitted via the network 150 from a center (not shown) managed by the cellular phone service provider. The display section 112 displays a variety of contents. The operation section 110 accepts instructions from the user.

The portable cellular phone terminal device 100 of the present embodiment has a camera function as an accessory function in addition to a communication function. The photographing section 114 is, for example, a digital camera for photographing an image in accordance with an instruction from the user via the operation section 110. The recording-section 116 stores the image photographed by the photographing section 114 in the photographed image storage section 120.

The control section 108 controls each of the functions of the portable cellular phone terminal device 100. The control information storage section 122 stores information referenced by the control section 108 when it controls these functions.

Figure 2:
FIG. 2 is a table for showing one example of a portion of a control information storage section shown in FIG. 1.

FIG. 2 is a table for showing one example of a portion of the control information storage section 122. As shown in it the FIG. 2, the control information storage section 122 has a function column and a utilization permission/denial column. The control information storage section 122 stores a function whose utilization is restricted if the user of the storage media 106 is not under contract with the cellular phone service provider. It is to be noted that "1" indicates a function whose utilization is permitted even if the user is not under contract with the cellular phone service provider. A function whose utilization is denied if the user is not under contract with the cellular phone service provider is indicated by "0". In the illustrated example, for example, even if the user of the storage media 106 is not under contract with the cellular phone service provider, utilization of the photographing function is permitted but utilization of a function to save a photographed image is denied.

The following will describe a procedure for processing by the control section 108 in a case where any one of the functions is selected by the user through the operation section 110.

When the control section 108 accepts any one of the functions selected by the user through the operation section 110, the media writing/reading section 104 reads the user information from the storage media 106. Based on the information read by the media writing/reading section 104, the control section 108 detects whether the user of the storage media 106 is under contract with the cellular phone service provider. If the user of the storage media 106 is under contract with the cellular phone service provider, the control section 108 performs the function selected by the user.

If the user of the storage media 106 is not under contract with the cellular phone service provider, on the other hand, the control section 108 references the control information storage section 122 to decide whether utilization of that function is permitted or denied. If the utilization of the user-selected function is restricted as a result of the decision by the control section 108, the control section 108 instructs the display section 112 to give an indication to the effect that the utilization of the user-selected function is restricted. If the utilization of the user-selected function is unrestricted as a result of the decision, on the other hand, the control section 108 performs the user-selected function.

Figure 3:
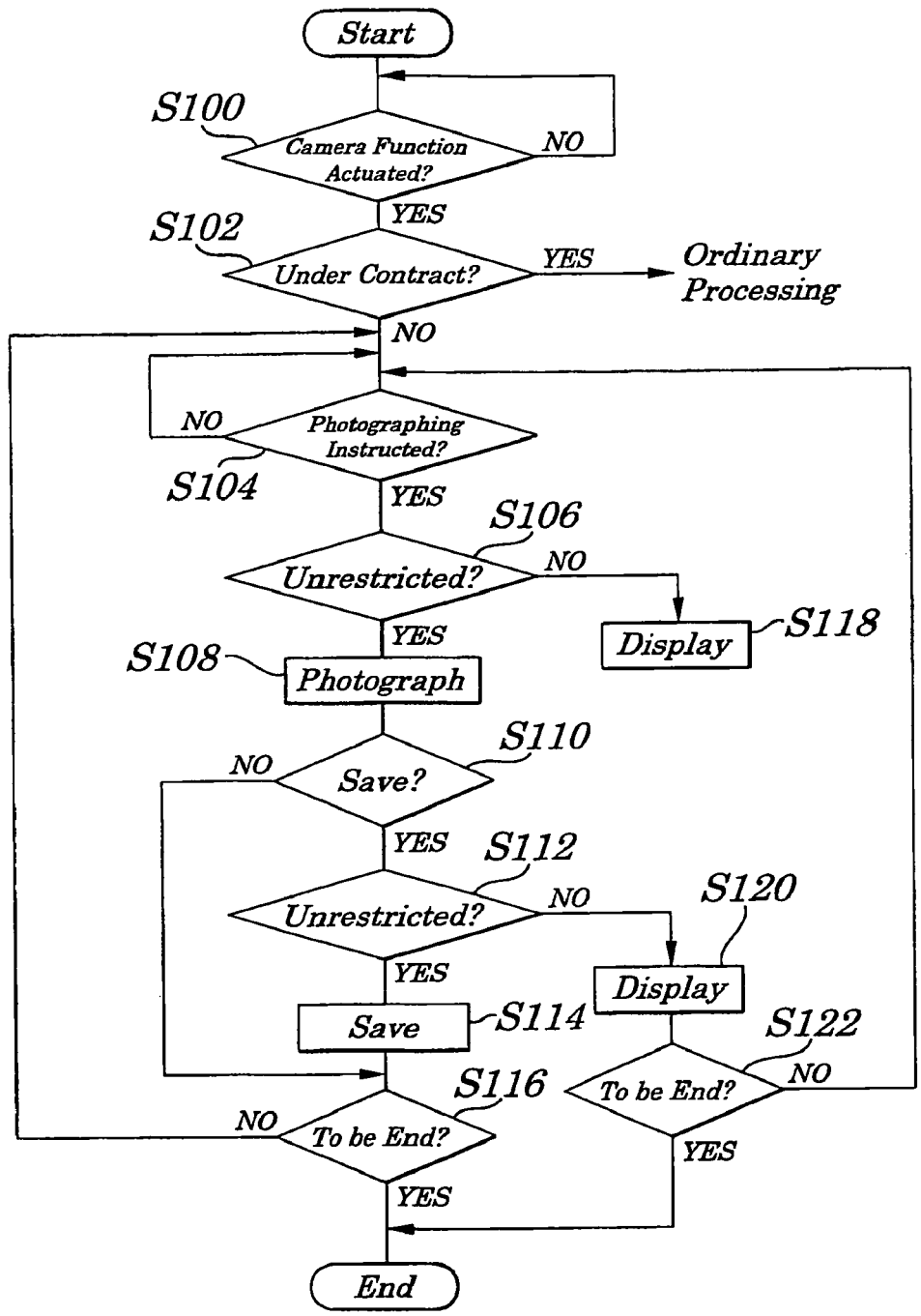
FIG. 3 is a flowchart for showing a processing procedure for the portable cellular phone terminal device shown in FIG. 1.

FIG. 3 is a flowchart for showing a processing procedure in a case where the camera function is actuated in the portable cellular phone terminal device 100. The following will describe it with reference to FIG. 1 also.

When the camera function is actuated (YES in Step S100), the control section 108 detects whether the user of the storage media 106 is under contract with the cellular phone service provider (S102). Specifically, according to an instruction from the control section 108, the media writing/reading section 104 reads information from the storage media 106. Based on the information read by the media writing/reading section 104, the control section 108 detects whether the user of the storage media 106 is under contract with the cellular phone service provider. Further, if any other function is actuated after the actuation of the portable cellular phone terminal device 100 and this detection is already performed, information about whether the user is under contract may also be stored in the control information storage section 122 so that the control section 108 can perform detection step S102 by referencing the control information storage section 122.

If the user of the storage media 106 is under contract with the cellular phone service provider (YES in Step S102), ordinary processing is performed because the camera function is unrestricted. The ordinary processing refers to such processing as to, for example, photograph an image, if instructed to do so, and save it, if instructed to do so by the user.

If it is detected at step S102 that the user is not under contract with it (NO in Step S102) and if the user instructs to perform photographing (YES in Step S104), the control section 108 references the control information storage section 122 to decide whether the photographing function can be utilized (S106). If the photographing function is unrestricted (YES in Step S106), the photographing section 114 photographs an image. If the photographing function is restricted (NO in Step S106), on the other hand, a message to the effect that the photographing function is restricted is displayed on the display section 112 (S118).

If, after the image is photographed at step S108, instructed by the user to save the photographed image (YES in Step S110), the control section 108 references the control information storage section 122 to decide whether a function to save photographed images can be utilized (S112). If the saving function is unrestricted (YES in Step S112), the recording section 116 saves the image photographed by the photographing section 114 in the photographed image storage section 120 (Sl14). If the saving function is restricted (NO in Step S112), on the other hand, a message to the effect that the saving function is restricted is displayed on the display section 112 (S120).

After the image is saved at step S114, the control section 108 accepts a user selection on whether to end the camera function (Sl16). If the user selects ending the camera function (YES in Step S116), the control section ends the camera function. If the user selects to not end the camera function at step S116 (NO in Step S116), on the other hand, the process returns to step S104 to repeat the same processing.

After the message is displayed at step S120, the control section accepts a user selection on whether to end the camera function (S122). If the user selects ending the camera function (YES in Step S122), the control section ends the camera function. If the user selects not to end the camera function at step S122 (NO in Step S122), on the other hand, the process returns to step S104 to repeat the same processing.

As described above, according to the portable cellular phone terminal device 100 in the present embodiment, depending on whether the user of the storage media 106 is under contract with the cellular phone service provider, utilization is restricted of the accessory functions of the portable cellular phone terminal device 100 to which the storage media 106 is attached. In such a configuration, if the user cancels the contract with the cellular phone service provider, the utilization of the accessory functions is restricted, so that it is possible to suppress an increase in number of users who would like to temporarily subscribe a contract of cellular phone services and buy a portable cellular phone terminal device inexpensively in order to utilize its accessory functions as described above.

Second Embodiment

When a detachable storage media is changed, a portable cellular phone terminal device according to the second embodiment of the present invention communicates with an apparatus on the side of a center managed by a cellular phone service provider, to acquire utilization restricting information of functions of the portable cellular phone terminal device from the center side apparatus. The portable cellular phone terminal device of the present embodiment is configured so that utilization of its functions may be restricted in accordance with the utilization restricting information acquired from the center side apparatus.

Figure 4:
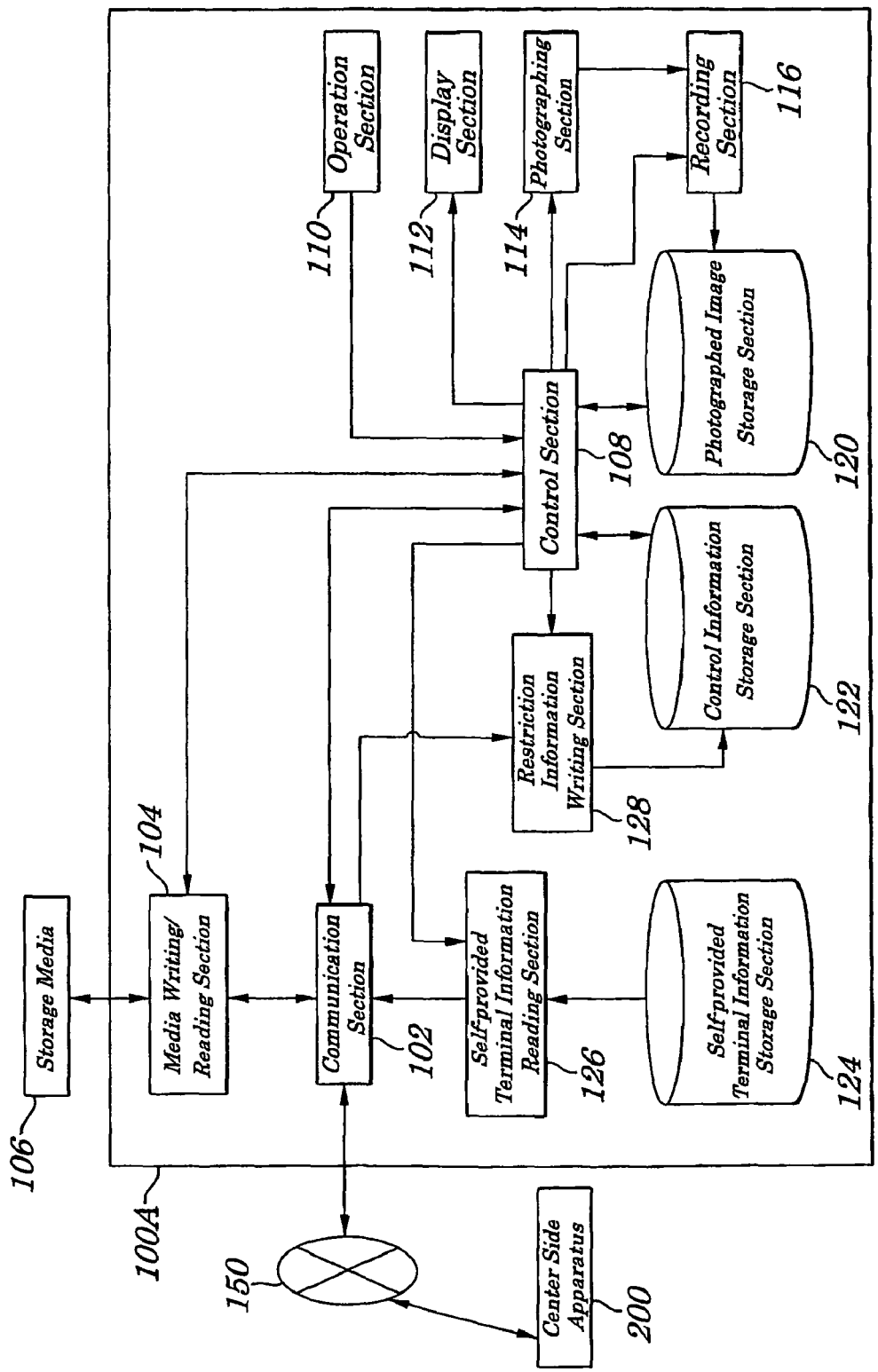
FIG. 4 is a block diagram for showing a configuration of a portable cellular phone terminal device of a second embodiment of the present invention.

FIG. 4 is a block diagram for showing a configuration of a portable cellular phone terminal device 100A of the present embodiment.

The portable cellular phone terminal device 100A of the present embodiment includes a self-provided terminal information storage section 124, a self-provided terminal information reading section 126, and a restriction information writing section 128 in addition to the components of the portable cellular phone terminal device 100 described with the first embodiment with reference to FIG. 1. In the present embodiment, the same components as those of the first embodiment are indicated by the same reference numbers and explanation of them is omitted as appropriate.

The self-provided terminal information storage section 124 stores ID information or a like of the portable cellular phone terminal device 100A. It is to be noted that although the ID information can be a serial number or a like specific to the portable cellular phone terminal device 100A, it may not be peculiar to the portable cellular phone terminal device 100A but can be information of a model or a like of the portable cellular phone terminal device 100A. The self-provided terminal information reading section 126 reads ID information of the portable cellular phone terminal device 100A from the self-provided terminal information storage section 124. In the present embodiment, a communication section 102 transmits, to a center side apparatus 200, the ID information of the portable cellular phone terminal device 100A read by the self-provided terminal information reading section 126 and user information of a storage media 106 read by a media writing/reading section 104.

In the second embodiment, the communication section 102 acquires utilization restricting information of functions of the portable cellular phone terminal device 100A from the center side apparatus 200. The restriction information writing section 128 writes the utilization restricting information acquired by the communication section 102, to a control information storage section 122. Further, if the storage media 106 is detached from the portable cellular phone terminal device 100A, by a time when the communication section 102 acquires new utilization restricting information, the restriction information writing section 128 writes to the control information storage section 122 such utilization restricting information as to lower a level of utilization of accessory functions of the portable cellular phone terminal device 100A to a predetermined level. A control section 108 controls utilization of the functions of the portable cellular phone terminal device 100A according to the utilization restricting information stored in the control information storage section 122.

Figure 5:
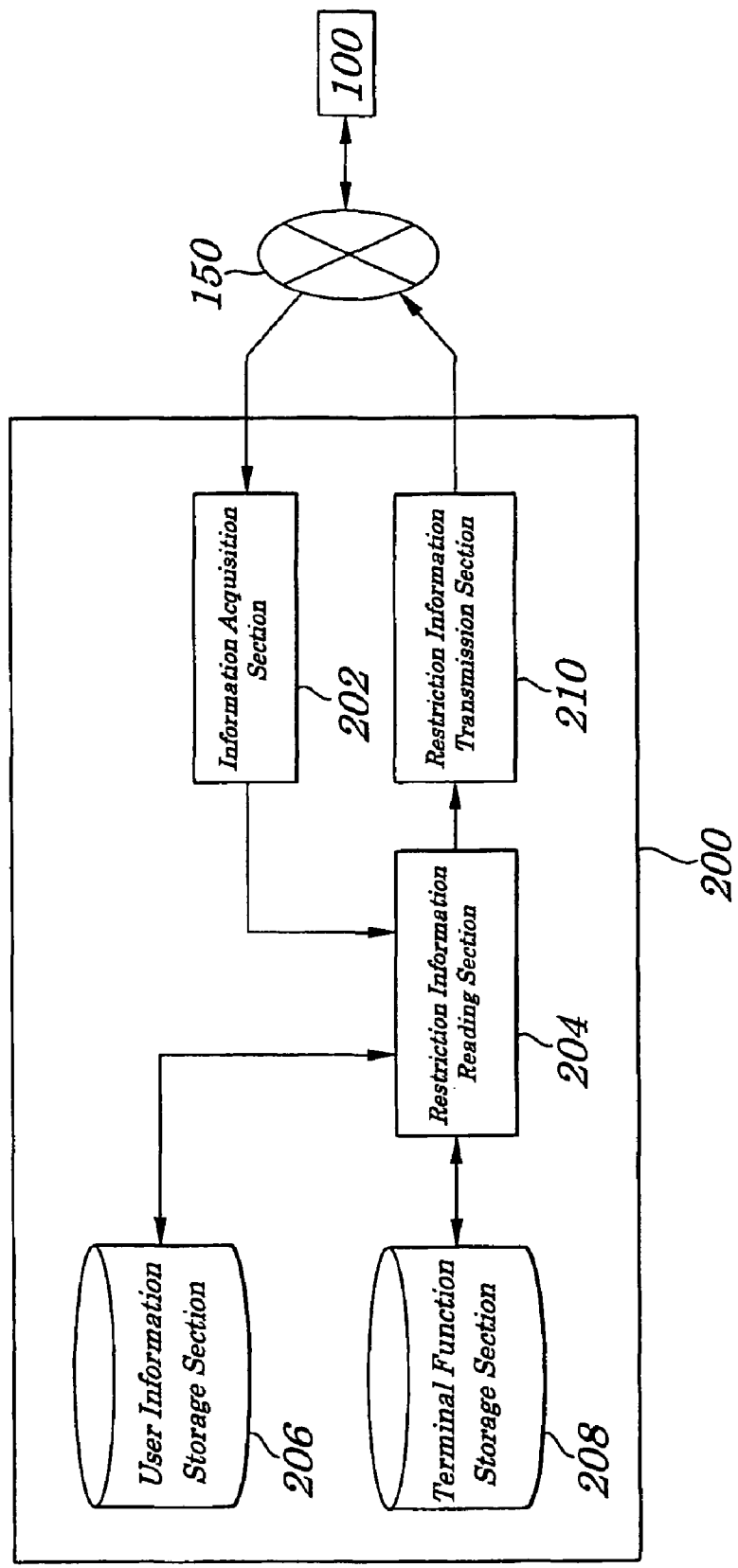
FIG. 5 is a block diagram for showing a configuration of an apparatus on the side of a center according to the second embodiment.

FIG. 5 is a block diagram for showing a configuration of the center side apparatus 200 of the present embodiment.

The center side apparatus 200 includes an information acquisition section 202, a restriction information reading section 204, a user information storage section 206, a terminal function storage section 208, and a restriction information transmission section 210.

The information acquisition section 202 acquires, via a network 150 from the portable cellular phone terminal device 100A, ID information of this terminal and user information of the storage media 106 attached to the portable cellular phone terminal device 100A. The restriction information reading section 204 reads information of a contract or a like of a relevant user from the user information storage section 206 based on the user information acquired by the information acquisition section 202. Further, based on the ID information of the cellular phone terminal 100A acquired by the information acquisition section 202, the restriction information reading section 204 reads the utilization restricting information by referencing a terminal function storage section 208. The restriction information transmission section 210 transmits the utilization restricting information read by the restriction information reading section 204 to the portable cellular phone terminal device 100A.

FIG. 6 is a table for showing one example of an internal configuration of the user information storage section 206.

The user information storage section 206 contains a user ID column, a contract-terms column, and a contract class column. The user ID column stores a user ID that identifies a subscriber. The contract-terms column indicates whether the relevant user is under contract with a cellular phone service provider. The contract class column stores a type of services over which the user is under contract with the cellular phone service provider. In this example, for example, contract class "A" has a higher service charge than contract class "B". It is supposed, for example, that a user of user ID "001" and a user of user ID "002" are under contract with the cellular phone service provider. The user of user ID "001" has contract class "A" and the user of user ID "002" has contract class "B". Further, a user of user ID "003" has cancelled a contract with the cellular phone service provider.

FIG. 7 is a table for showing one example of an internal configuration of the terminal function storage section 208.

The terminal function storage section 208 contains a model column and function columns. The model column stores a model number that identifies a model of the portable cellular phone terminal device 100B. The function columns store information about restriction on utilization of functions. For example, the portable cellular phone terminal device 100B of a model "ab1" and a portable cellular phone terminal device 100B of a model "ab2" have a function of photographing by use of a camera and an image saving function. The portable cellular phone terminal device 100B of a model "ab3" has a TV function in addition to the camera photographing function and the image saving function.

It is to be noted that a function marked "unrestricted" in the function column can be utilized without restriction regardless of whether the user is under contract with the cellular phone service provider and also regardless of the contract class. A function marked "A, B" in the function column can be utilized if the user is under contract with the cellular phone service provider and the contract class is "A" or "B". A function marked "A" in the function column can be utilized only if the user is under contract with the cellular phone service provider and the contract class is "A".

For example, in a case where a user whose class of a contract with the cellular phone service provider is "B" tries to use a portable cellular phone terminal device 100B of the model "ab3" by attaching to this portable cellular phone terminal device 100B the storage media 106 in which his ID information is stored, he can use the communication function but not the camera-photographing function, the image saving function, and the TV function.

Further, for example, in a case where a user who has cancelled his contract with the cellular phone service provider tries to utilize the portable cellular phone terminal device 100B of the model "ab1" by attaching to this portable cellular phone terminal device 100B the storage media 106 in which his ID information is stored, he cannot use the communication function but can use the camera-photographing function. However, he cannot use the image saving function.

Additionally, for example, in a case where a user whose class of a contract with the cellular phone service provider is "A" or "B" tries to utilize the portable cellular phone terminal device 100B of the model "ab1" or "ab2" by attaching to this portable cellular phone terminal device 100B the storage media 106 in which his ID information is stored, he can use both of the camera-photographing and image saving functions without restriction.

Figure 8:
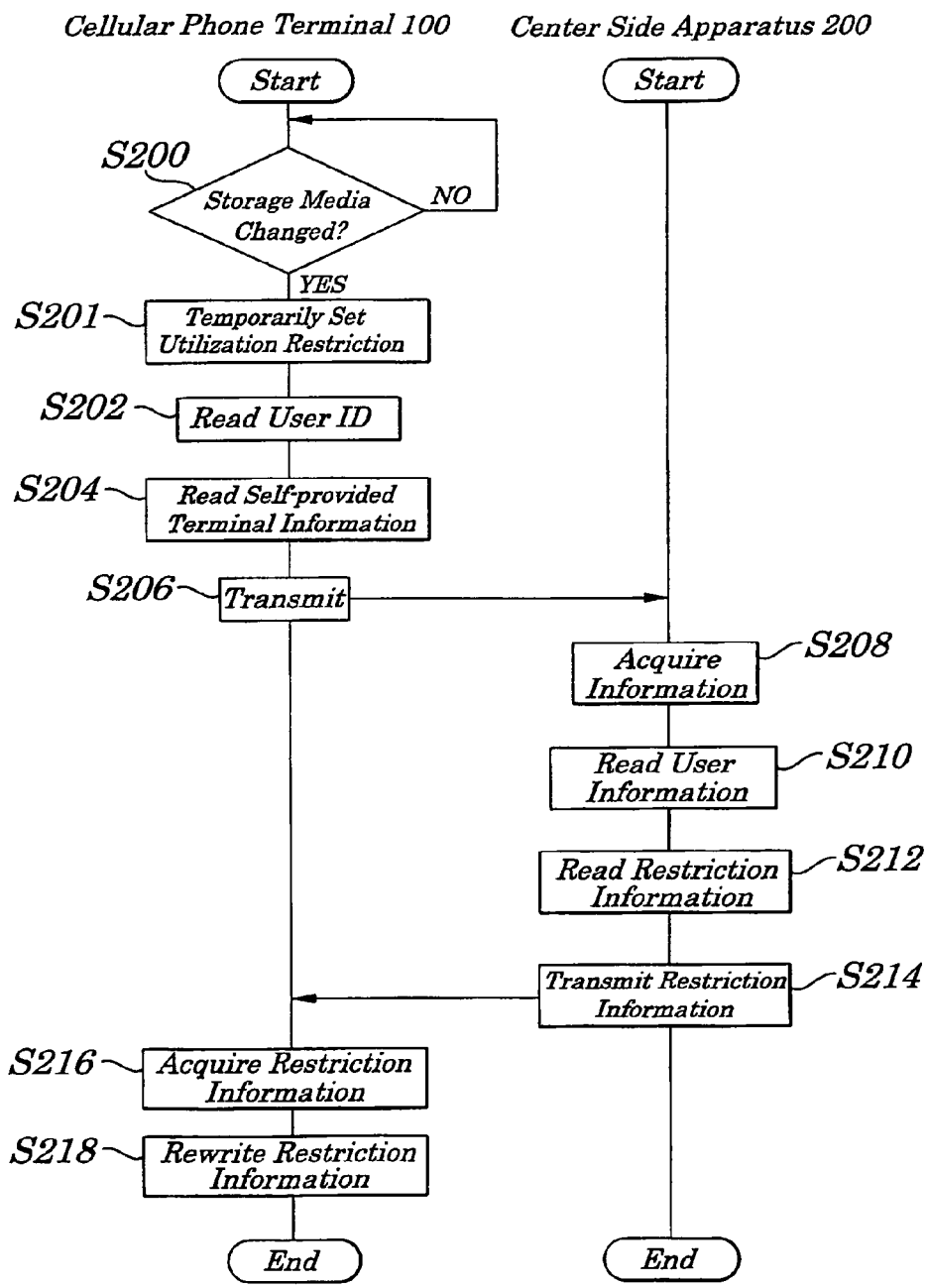
FIG. 8 is a flowchart for showing processing procedures for the portable cellular phone terminal device and the center side apparatus shown in FIGS. 5 and 6 respectively.

FIG. 8 is a flowchart for showing a processing procedure for a portable cellular phone system configured above.

First, in the portable cellular phone terminal device 100A, if the storage media 106 is changed (YES in Step S200), the control section 108 instructs the restriction information writing section 128 to rewrite utilization restricting information with that of a predetermined level (S201). Further, the media writing/reading section 104 reads user ID from the storage media 106 (S202). Simultaneously, the self-provided terminal information reading section 126 reads self-provided terminal information from the self-provided terminal information storage section 124 (S204). The communication section 102 transmits to the center side apparatus 200 the user ID read by the media writing/reading section 104 and the self-provided terminal information read by the self-provided terminal information reading section 126.

In the center side apparatus 200, the information acquisition section 202 acquires the user ID and the self-provided terminal information that are transmitted from the portable cellular phone terminal device 100A (S208). Based on the user ID acquired by the information acquisition section 202, the restriction information reading section 204 reads that user ID from the user information storage section 206 (S210). Subsequently, the restriction information reading section 204 reads the utilization restricting information from the terminal function storage section 208 based on the self-provided terminal information acquired by the information acquisition section 202 and the user information read by the user information storage section 206 (S212). The restriction information transmission section 210 transmits the utilization restricting information read by the restriction information reading section 204 to the portable cellular phone terminal device 100A (S214).

In the portable cellular phone terminal device 100A, the communication section 102 acquires the utilization restricting information transmitted from the center side apparatus

200 (S216) The restriction information writing section 128 writes the utilization restricting information acquired by the communication section 102 to the control information storage section 122, to update the utilization restricting information.

Then, the control section 108 controls the functions of the portable cellular phone terminal device 100A based on the utilization restricting information stored in the control information storage section 122.

In such a manner, according to the portable cellular phone terminal device 100A of the present embodiment, utilization of the accessory functions of the portable cellular phone terminal device 100A to which the storage media 106 is attached is restricted in accordance with terms of the contract of the user of the storage media 106 with the cellular phone service provider. Accordingly, it is possible to suppress an increase in number of users who would like to temporarily subscribe a contract of cellular phone services and buy a portable cellular phone terminal device inexpensively in order to utilize its accessory functions other than the communication function.

Further, in the case of a portable cellular phone terminal device of a type that uses a storage media such as a SIM card that can be detached from the portable cellular phone terminal device, a user can arbitrarily combine the storage media and the portable cellular phone terminal device, so that it is difficult to manage them on the side of a cellular phone service provider. According to the present invention, if the user attaches a new storage media to a portable cellular phone terminal device, user information stored in the storage media and terminal information of the portable cellular phone terminal device are transmitted to a center side apparatus, so that it is possible to manage the storage media and the portable cellular phone terminal device to which the storage media is attached, on the side of the cellular phone service provider.

It is apparent that the present invention is not limited to the above embodiments but may be changed and modified without departing from the scope and spirit of the invention.

Although in the first embodiment when any one of the functions selected by the user has been received, the media writing/reading section 104 reads information from the storage media 106, the media writing/reading section 104 can read the information from the storage media 106 at any other proper timing, for example, when the portable cellular phone terminal device 100A is actuated, to detect whether a user of the storage media 106 is under contract with a cellular phone service provider. In this case, it is possible to establish in the control information storage section 122 a flag that indicates whether the user of the storage media 106 is under contract with the cellular phone service provider. With this, if a user selection of any one of the functions is received, the control section 108 can reference the flag in the control information storage section 122 to detect whether the user of the storage media 106 is under contract with the cellular phone service provider.

Further, by causing the media writing/reading section 104 to read the information from the storage media 106 only when any one of the functions is selected first after the actuation of the portable cellular phone terminal device 100A, it is possible to establish in the control information storage section 122 a flag that indicates, when the function is selected, whether the user of the storage media 106 is under contract with the cellular phone service provider. Then, if any one of the other functions is selected, the control section 108 can reference the flag in the control information storage section 122 to detect whether the user of the storage media 106 is under contract with the cellular phone service provider.

When the storage media 106 is changed, the portable cellular phone terminal device 100A can accept an input of a password from the user so that utilization of its accessory functions may be enabled only when the password is valid. The portable cellular phone terminal device 100A can further include, for example, a password acceptance section for accepting an input of passwords, whereby when a new storage media 106 is attached, the control section 108 can restrict a level of utilization of the accessory functions to a predetermined level until the password acceptance section verified a valid password.

In this case, the portable cellular phone terminal device 100A can incorporate a password storage section for storing passwords, whereby the password acceptance section can decide whether an accepted password is valid in accordance with whether this accepted password agrees with a password stored in the password.

Further, by registering passwords in the center side apparatus 200, it is also possible to transmit from the portable cellular phone terminal device 100A to the center side apparatus 200 a password accepted by the password acceptance section together with user ID stored in the storage media 106 so that a result of decision on whether the password is valid may be received from the center side apparatus 200. The center side apparatus 200 can contain a table that the user ID and the password are associated with each other, by which whether the password is valid can be decided by referencing this table.

In such a manner, in a case where a portable cellular phone terminal device provided with accessory functions is, for example, stolen by an illegal user, even if the user tries to utilize the accessory functions by attaching his own storage media 106 to that portable cellular phone terminal device, it is possible to restrict utilization of the accessory functions. It is thus possible to mitigate damages due to robbery or a like of the portable cellular phone terminal device having value-added accessory functions.

Although in the above embodiments the camera-photographing function, the image saving function, and the TV function have been exemplified as the accessory functions other than the communication function, the accessory functions may include any other various functions. They may be, for example, music play-back, an address book, a schedule book, a memo (voice recorder), a calculator, a clock, an alarm, a stop watch, a dictionary, a game, or a like.

What is claimed is:

1. A portable cellular phone terminal device having a communication function for communicating via a network and a plurality of accessory functions in addition to the communication function, said portable cellular phone terminal device comprising:

a reading section for reading ID information containing information for connection with said network, the reading section reading said ID information from a storage media that stores the ID information and that is configured to be detachable from the portable cellular phone terminal device; and a control section for restricting utilization of the plurality of accessory functions in a case where said storage media is detached or the communication by use of the ID information is not allowed, wherein said control section separately restricts utilization of each of the plurality of accessory functions.

2. The portable cellular phone terminal device according to claim 1, further comprising a restriction information storage section for storing utilization restricting information including the accessory function and presence/absence information concerning whether utilization of the accessory function by the device itself is restricted, which are associated with each other; wherein said control section restricts on utilizing the accessory function based on the utilization restricting information.

3. The portable cellular phone terminal device according to claim 1, further comprising a password acceptance means for accepting an input of a password, wherein when said storage media is newly attached, said control section restricts a level of utilization of the accessory function at a predetermined level until said password acceptance means verifies a valid password.

4. A portable cellular phone terminal device having a communication function for communicating via a network and at least one accessory function in addition to the communication function, said portable cellular phone terminal device comprising:
   a reading section for reading user information of a user who has contracted for cellular phone services provided by a cellular phone service provider, from a storage media that stores the user information and is configured to be detachable; and
   a control section for restricting utilization of the at least one accessory function based on a contract class associated with the user information, for which the user has contracted.

5. The portable cellular phone terminal device according to claim 4, further comprising:
   a terminal information storage section for storing self-provided information about the device itself;
   a notification section for notifying an information transmitting center managed by said cellular phone service provider of the user information stored in said storage media and the self-provided information about the device; and
   a receiving section for receiving utilization restricting information about restricting utilization of the at least one accessory function defined in accordance with the self-provided information about the device itself and the contract class, associated with the user information, for which the user has contracted,
   wherein said control section restricts utilization of the at least one accessory function according to the utilization restricting information.

6. The portable cellular phone terminal device according to claim 5, wherein:
   when said storage media is newly attached, said control section restricts a level of utilization of the at least one accessory function to a predetermined level until said receiving section receives an updated utilization restricting information; and
   when said storage media is newly attached, said notification section notifies said information transmitting center of the user information stored in the storage media and the self-provided information about the device.

7. The portable cellular phone terminal device according to claim 4, further comprising:
   a utilization restricting information storage section for storing utilization restricting information about the at least one accessory function defined in accordance with the contract class, associated with the user information, for which the user has contracted,
   wherein said control section restricts utilization of the at least one accessory function by referencing said utilization restricting information storage section.

8. The portable cellular phone terminal device according to claim 4, further comprising a password acceptance means for accepting an input of a password, wherein when said storage media is newly attached, said control section restricts a level of utilization of the accessory function to a predetermined level until said password acceptance means verifies a valid password.

9. A portable cellular phone system comprising:
   a portable cellular phone terminal device having a communication function for communicating via a network and at least one accessory function in addition to the communication function, said portable cellular phone terminal device comprising:
      a reading section for reading user information of a user who has contracted for cellular phone services provided by a cellular phone service provider, from a storage media that stores the user information and is configured to be detachable; and
      a control section for restricting utilization of the at least one accessory function based on a contract class, associated with the user information, for which the user has contracted, and
   an information transmitting center further comprising:
      an information acquisition section for acquiring the user information stored in said storage media attached to said portable cellular phone terminal device, from said portable cellular phone terminal device; and
      a transmission section for transmitting to said portable cellular phone terminal device utilization restricting information about the at least one accessory function defined in accordance with the contract class, associated with the user information, for which the user has contracted.

* * * * *